(12) United States Patent
Tagawa et al.

(10) Patent No.: US 11,328,684 B2
(45) Date of Patent: May 10, 2022

(54) LIQUID CRYSTAL DISPLAY DEVICE WITH DISPLAY QUALITY DIFFERENCE PREVENTION BETWEEN DISPLAY PANELS

(71) Applicant: SHARP KABUSHIKI KAISHA, Sakai (JP)

(72) Inventors: Akira Tagawa, Sakai (JP); Jun Nishimura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/323,133

(22) Filed: May 18, 2021

(65) Prior Publication Data

US 2021/0375228 A1 Dec. 2, 2021

Related U.S. Application Data

(60) Provisional application No. 63/032,561, filed on May 30, 2020.

(51) Int. Cl.
  *G09G 3/36* (2006.01)
(52) U.S. Cl.
  CPC ... *G09G 3/3688* (2013.01); *G09G 2310/0297* (2013.01)
(58) Field of Classification Search
  CPC ...... G06F 3/041; G06F 3/0412; G06F 3/0414; G06F 3/044; G06F 3/045; G09G 3/36; G09G 3/3622; G09G 3/3625; G09G 3/364; G09G 3/3644; G09G 3/3677; G09G 3/3681; G09G 3/3685; G09G 3/3688; G09G 3/3692; G09G 2310/0297

USPC .................................. 345/87–104, 173–179
See application file for complete search history.

(56) References Cited

U.S. PATENT DOCUMENTS

| 10,984,747 | B2* | 4/2021 | Tagawa ................ G09G 3/3688 |
| 2008/0012815 | A1* | 1/2008 | Kawata .................. G09G 3/006 |
| | | | 345/98 |
| 2008/0180369 | A1* | 7/2008 | Chiu .................... G09G 3/3614 |
| | | | 345/87 |
| 2008/0224982 | A1* | 9/2008 | Yamazaki ............ G09G 3/3688 |
| | | | 345/98 |
| 2009/0289878 | A1* | 11/2009 | Chen .................... G09G 3/3688 |
| | | | 345/87 |

(Continued)

FOREIGN PATENT DOCUMENTS

JP 2004-361427 A 12/2004

*Primary Examiner* — Alexander Eisen
*Assistant Examiner* — Nelson Lam
(74) *Attorney, Agent, or Firm* — ScienBiziP, P.C.

(57) ABSTRACT

A display device includes a first display panel with a touch function, a second display panel without a touch function, a first data line drive circuit and a first demultiplexer circuit configured to drive data lines of the first display panel in a time-division manner in accordance with K first control signals, and a second data line drive circuit and a second demultiplexer circuit configured to drive data lines of the second display panel in a time-division manner in accordance with K second control signals. A horizontal period used to drive the first display panel is shorter than a horizontal period used to drive the second display panel, and a length of a period in which each of the first control signals is at a selection level and a length of a period in which each of the second control signals is at a selection level are approximately the same.

20 Claims, 12 Drawing Sheets

(56) References Cited

U.S. PATENT DOCUMENTS

| | | | |
|---|---|---|---|
| 2010/0091046 A1* | 4/2010 | Matsuura | G09G 3/3677 345/690 |
| 2010/0156776 A1* | 6/2010 | Jeoung | G09G 3/3688 345/98 |
| 2018/0188863 A1* | 7/2018 | Yi | G06F 3/04184 |

* cited by examiner

LIQUID CRYSTAL DISPLAY DEVICE WITH DISPLAY QUALITY DIFFERENCE PREVENTION BETWEEN DISPLAY PANELS

CROSS-REFERENCE TO RELATED APPLICATIONS

This application claims the benefit of priority to U.S. Provisional Application No. 63/032,561 filed on May 30, 2020. The entire contents of the above-identified application are hereby incorporated by reference.

BACKGROUND

Technical Field

The disclosure relates to a display device, and particularly relates to a display device including a plurality of display panels and a drive method thereof.

A liquid crystal display device such as a liquid crystal display device may be provided on a dashboard of an automobile. In an on-board liquid crystal display device, for example, a liquid crystal module including two liquid crystal panels having the same screen size is used to improve designability (see FIG. 10). In this liquid crystal module, the two liquid crystal panels are arranged side-by-side in the horizontal direction with their longitudinal directions being matched with each other. In many cases, one liquid crystal panel has a function (hereinafter referred to as a touch function) of detecting a position touched by a finger or the like, and the other liquid crystal panel does not have the touch function. Hereinafter, the former is referred to as a "liquid crystal panel with a touch function", and the latter is referred to as a "liquid crystal panel without a touch function".

Separately, a liquid crystal display device that drives data lines in a time-division manner are known in the related art. In such a liquid crystal display device that drives the data lines in a time-division manner, a demultiplexer circuit is formed using thin film transistors (TFTs) on the liquid crystal panel to apply an output voltage of the data line drive circuit to K data lines (K is an integer of 2 or greater) in a time-division manner. For example, when K=3, the demultiplexer circuit is controlled using three control signals RSW, GSW, and BSW. In a signal waveform diagram illustrated in FIG. 11, the control signals RSW, GSW, and BSW are at a high level for the same time within a one horizontal period.

JP2004-361427A describes that in a liquid crystal display device that drives the data lines in a time-division manner, high level periods of the three control signals are set to different lengths. The above-described publication describes, as illustrated in FIG. 12, that when controlling the demultiplexer circuit using the three control signals RSEL, GSEL, and BSEL, a length of the high level period of the control signal GSEL is set to be less than or equal to a length of the high level period of the control signal RSEL, and a length of the high level period of the control signal BSEL is set to be less than or equal to a length of the high level period of the control signal GSEL.

In the liquid crystal module illustrated in FIG. 10, a case is considered in which the data lines included in the two liquid crystal panels are driven in a time-division manner. In the liquid crystal panel with the touch function, one or more touch detection periods are provided within one vertical period, and the drive of scanning lines need to be stopped in the touch detection periods. Thus, in the liquid crystal panel with the touch function, the one horizontal period is shorter compared to that of the liquid crystal panel without the touch function, and the deterioration rate of the TFTs included in the demultiplexer circuit formed on the liquid crystal panel is slow. As a result, when the liquid crystal module is used for an extended period of time, a difference in display quality is generated between the two liquid crystal panels.

As a method for solving this problem, a method is conceivable in which the demultiplexer circuits included in the two liquid crystal panels are designed using TFTs of different sizes in consideration of the difference in deterioration rate between the TFTs. However, this method has the problem that the design cost and manufacturing cost of the liquid crystal panels increase.

In a case where the liquid crystal panel without the touch function is driven at the same timing as the liquid crystal panel with the touch function (driven while the drive of the scanning lines is stopped), the length of the horizontal period of the liquid crystal panel without the touch function can be made equal to the length of the horizontal period of the liquid crystal panel with the touch function. However, a control IC for the liquid crystal panel with the touch function is more expensive than the normal control IC by an amount of having the function of stopping the drive of the scanning lines. Thus, using the control IC having the function of stopping the drive of the scanning lines also in the liquid crystal panel without the touch function increases the cost of the liquid crystal display device.

SUMMARY

Accordingly, a problem is to provide a display device that can easily prevent a difference in display quality between display panels by driving data lines of a plurality of display panels in a time-division manner.

(1) A display device according to some embodiments of the disclosure includes:

a first display panel with a touch function
a second display panel without a touch function;
a first data line drive circuit configured to output a voltage to be applied to data lines of the first display panel;
a first demultiplexer circuit formed on the first display panel and configured to output the voltage output from the first data line drive circuit to any of K (K is an integer of 2 or greater) data lines of the first display panel in accordance with K first control signals;
a second data line drive circuit configured to output a voltage to be applied to data lines of the second display panel; and
a second demultiplexer circuit formed on the second display panel and configured to output the voltage output from the second data line drive circuit to any of K data lines of the second display panel in accordance with K second control signals,
wherein a horizontal period used to drive the first display panel is shorter than a horizontal period used to drive the second display panel, and a length of a period in which each of the first control signals is at a selection level and a length of a period in which each of the second control signals is at a selection level are approximately the same.

According to the display device described above, since the length of the period in which each of the first control signals is at the selection level and the length of the period in which each of the second control signals is at the selection level is approximately the same, in a case where the first demultiplexer circuit and the second demultiplexer circuit are configured to be identical circuits, the deterioration rate of the first demultiplexer circuit and the deterioration rate of the second demultiplexer circuit are approximately the same. Thus, when the display device is used for an extended period of time, the difference in display quality between the display panels due to the difference in deterioration rate between the demultiplexer circuits can be easily prevented.

(2) A display device according to some embodiments of the disclosure has the configuration of above-described (1),
wherein the length of the period in which each of the first control signals is at the selection level is approximately 1/K of a length of a data setting period within the horizontal period used to drive the first display panel.

(3) A display device according to some embodiments of the disclosure has the configuration of above-described (1),
wherein the period in which each of the second control signals is at the selection level is set in a central portion of each of the periods obtained by dividing a data setting period within the horizontal period used to drive the second display panel into K equal periods.

(4) A display device according to some embodiments of the disclosure has the configuration of above-described (1),
wherein the period in which each of the second control signals is at the selection level is set to a head portion of each of the periods obtained by dividing a data setting period within the horizontal period used to drive the second display panel into K equal periods.

(5) A display device according to some embodiments of the disclosure has the configuration of above-described (1),
wherein the period in which each of the second control signals is at the selection level is set to the same time period as the period in which each of the first control signals is at the selection level.

(6) A display device according to some embodiments of the disclosure has the configuration of above-described (1),
wherein the first demultiplexer circuit includes K thin film transistors corresponding to respective output terminals of the first data line drive circuit, and
the second demultiplexer circuit includes K thin film transistors corresponding to respective output terminals of the second data line drive circuit.

(7) A display device according to some embodiments of the disclosure has the configuration of above-described (6),
wherein the first and second demultiplexer circuits are identical circuits configured using the thin film transistors of the same size.

(8) A display device according to some embodiments of the disclosure has the configuration of above-described (6),
wherein the thin film transistors included in the first and second demultiplexer circuits are formed using an oxide semiconductor.

(9) A display device according to some embodiments of the disclosure has the configuration of above-described (6),
wherein the thin film transistors included in the first and second demultiplexer circuits are N-channel type transistors, and the selection level is a high level.

(10) A display device according to some embodiments of the disclosure has the configuration of above-described (6),
wherein the thin film transistors included in the first and second demultiplexer circuits are P-channel type transistors, and the selection level is a low level.

(11) A display device according to some embodiments of the disclosure has the configuration of above-described (1),
wherein the first and second display panels are liquid crystal panels and arranged with their longitudinal directions being matched with each other.

(12) A display device according to some embodiments of the disclosure has the configuration of above-described (1), wherein K is 3.

(13) A display device according to some embodiments of the disclosure has the configuration of above-described (1), wherein K is 2.

(14) A drive method of a display device according to some embodiments of the disclosure is a drive method of a display device including a first display panel with a touch function and a second display panel without a touch function, the drive method including:
outputting a voltage to be applied to data lines of the first display panel from a first data line drive circuit;
outputting the voltage output from the first data line drive circuit to any of K (K is an integer of 2 or greater) data lines of the first display panel in accordance with K first control signals by using a first demultiplexer circuit formed on the first display panel;
outputting a voltage to be applied to data lines of the second display panel from a second data line drive circuit; and
outputting the voltage output from the second data line drive circuit to any of K data lines of the second display panel in accordance with K second control signals by using a second demultiplexer circuit formed on the second display panel,
wherein a horizontal period used to drive the first display panel is shorter than a horizontal period used to drive the second display panel, and a length of a period in which each of the first control signals is at a selection level and a length of a period in which each of the second control signals is at a selection level are approximately the same.

According to the above-described drive method of a display device, the same effect can be achieved as the display device having the configuration of above-described (1).

(15) A drive method of a display device according to some embodiments of the disclosure has the configuration of above-described (14),
wherein a length of a period in which each of the first control signals is at a selection level is approximately 1/K of a length of a data setting period within the horizontal period used to drive the first display panel.

(16) A drive method of a display device according to some embodiments of the disclosure has the configuration of above-described (14),
wherein the period in which each of the second control signals is at the selection level is set in a central portion of each of the periods obtained by dividing a data setting period within the horizontal period used to drive the second display panel into K equal periods.

(17) A drive method of a display device according to some embodiments of the disclosure has the configuration of above-described (14),
wherein the period in which each of the second control signals is at the selection level is set to a head portion of each of the periods obtained by dividing a data setting period within the horizontal period used to drive the second display panel into K equal periods.

(18) A drive method of a display device according to some embodiments of the disclosure has the configuration of above-described (14),
wherein the period in which each of the second control signals is at the selection level is set to the same time period as the period in which each of the first control signals is at the selection level.

(19) A drive method of a display device according to some embodiments of the disclosure has the configuration of above-described (14),
wherein the first demultiplexer circuit includes K thin film transistors corresponding to respective output terminals of the first data line drive circuit, and the second demultiplexer circuit includes K thin film transistors corresponding to respective output terminals of the second data line drive circuit.

(20) A drive method of a display device according to some embodiments of the disclosure has the configuration of above-described (19), wherein the thin film transistors included in the first and second demultiplexer circuits are formed using an oxide semiconductor.

These and other objects, features, aspects, and advantages of the disclosure will become more apparent from the following detailed description with reference to the accompanying drawings.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
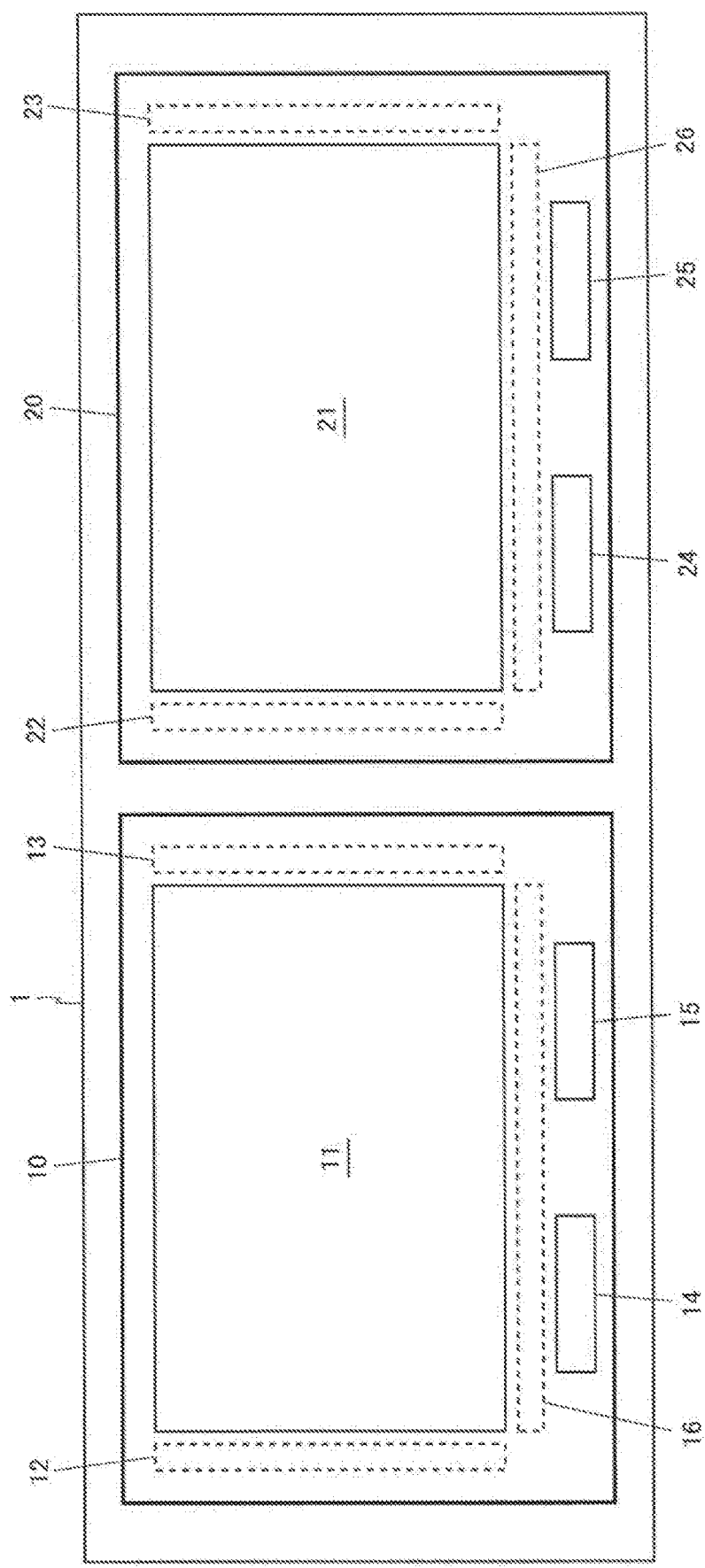
FIG. 1 is a diagram illustrating an overall configuration of a liquid crystal display device according to a first embodiment.

FIG. 1 is a diagram illustrating an overall configuration of a liquid crystal display device according to a first embodiment. The liquid crystal display device 1 illustrated in FIG. 1 is a liquid crystal module including two liquid crystal panels 10 and 20 having the same screen size. The liquid crystal panels 10 and 20 are arranged side-by-side in the horizontal direction with their longitudinal directions being matched with each other. The liquid crystal panel 10 is a liquid crystal panel with the touch function, and the liquid crystal panel 20 is a liquid crystal panel without the touch function.

The liquid crystal panel 10 has a structure in which a liquid crystal (not illustrated) is sandwiched between a TFT substrate and a counter substrate (not illustrated). The TFT substrate of the liquid crystal panel 10 is provided with a plurality of scanning lines, a plurality of data lines, and a pixel area 11 including a plurality of pixel circuits (see FIG. 2 to be described later). The plurality of scanning lines extend in a horizontal direction of the diagram and are arranged parallel to each other. The plurality of data lines are arranged parallel to each other to be orthogonal to the plurality of scanning lines. Each of the plurality of pixel circuits is arranged corresponding to an intersection point of each of the plurality of scanning lines and each of the plurality of data lines.

Scanning line drive circuits 12 and 13 are provided on a left side and a right side of the pixel area 11 respectively. The scanning line drive circuits 12 and 13 are formed using TFTs on the TFT substrate of the liquid crystal panel 10. The scanning line drive circuits 12 and 13 are connected to the plurality of scanning lines, and drive the plurality of scanning lines from both ends. Data line drive circuits 14 and 15 are provided on the lower side of the pixel area 11. The data line drive circuits 14 and 15 are built into IC chips and mounted on the TFT substrate of the liquid crystal panel 10. A demultiplexer circuit 16 is provided between the pixel area 11 and the data line drive circuits 14 and 15. The demultiplexer circuit 16 is formed using TFTs on the TFT substrate of the liquid crystal panel 10. The data line drive circuits 14 and 15 and the demultiplexer circuit 16 drive the plurality of data lines in a time-division manner.

Figure 2:
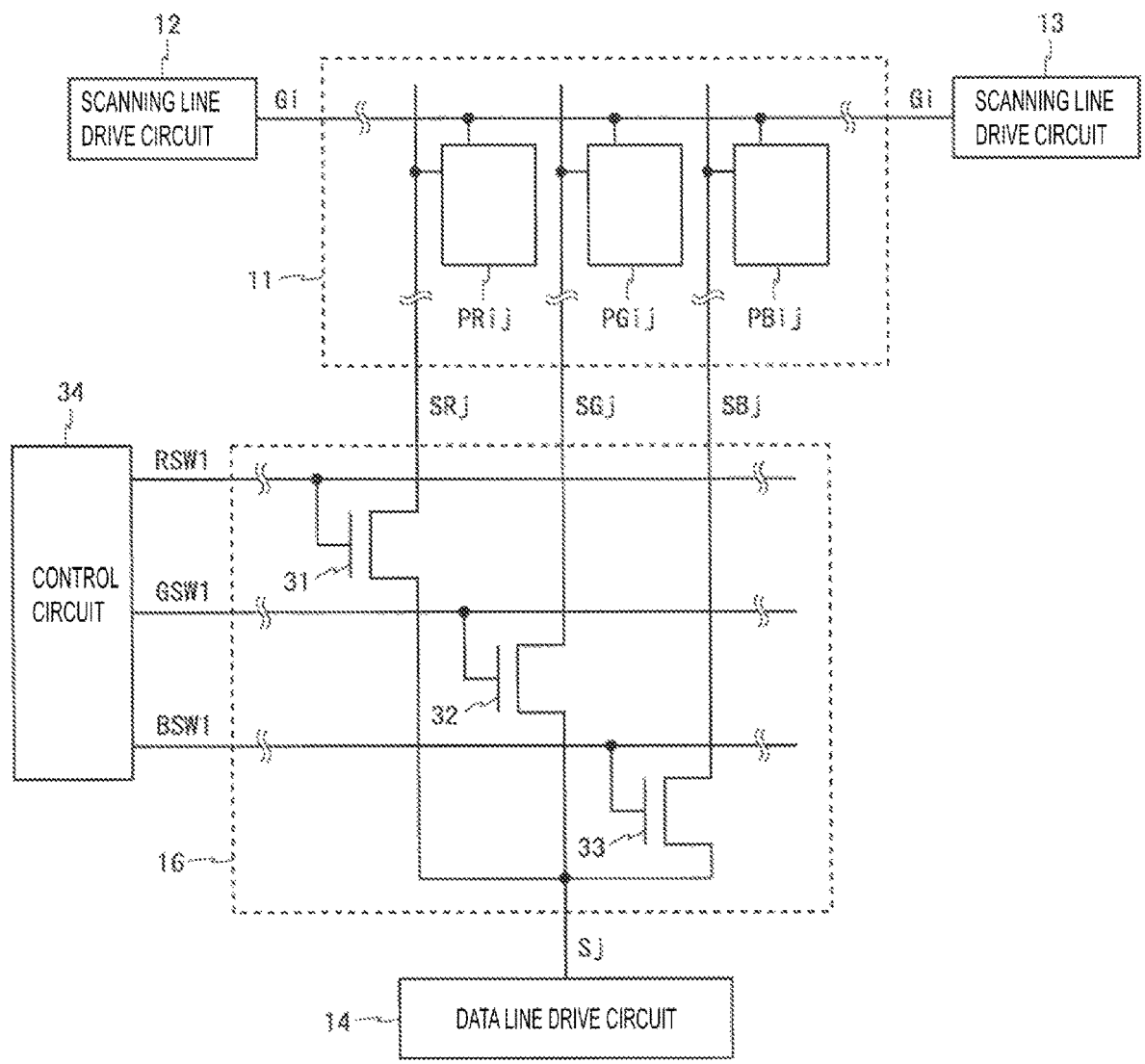
FIG. 2 is a circuit diagram illustrating a demultiplexer circuit of the liquid crystal display device illustrated in FIG. 1.

FIG. 2 is a circuit diagram of the demultiplexer circuit 16. Three data lines SRj, SGj, and SBj illustrated in FIG. 2 are driven by using the data line drive circuit 14. In FIG. 2, in the demultiplexer circuit 16, a circuit (hereinafter referred to as a circuit C1) corresponding to the data lines SRj, SGj, and SBj and three pixel circuits PRij, PGij, and PBij provided corresponding to the respective intersection points of the scanning line Gi and the data lines SRj, SGj, and SBj are described. The circuit C1 includes three N-channel type TFTs 31 to 33. The control circuit 34 outputs three control signals RSW1, GSW1, and BSW1 to control the demultiplexer circuit 16.

One of the conduction terminals (the lower terminals in FIG. 2) of each of the TFTs 31 to 33 is connected to the output terminal Sj of the data line drive circuit 14. Hereinafter, a voltage output from the output terminal Sj is referred to as the output voltage Vj. The other conduction terminals of each of the TFTs 31 to 33 is connected to a corresponding one of the data lines SRj, SGj, and SBj. The control signals RSW1, GSW1, and BSW1 are applied to the gate terminals of the TFTs 31 to 33, respectively.

A first period in which the control signal RSW1 is at the high level, a second period in which the control signal GSW1 is at the high level, and a third period in which the control signal BSW1 is at the high level are set within the horizontal period used to drive the liquid crystal panel 10, so that they do not overlap with each other. In the first period, the TFT 31 is on and the TFTs 32 and 33 are off, and thus the output voltage Vj is output from the demultiplexer circuit 16 to the data line SRj. In the second period, the TFT32 is on and the TFTs 31 and 33 are off, and thus the output voltage Vj is output from the demultiplexer circuit 16 to the data line SGj. In the third period, the TFT 33 is on and the TFTs 31 and 32 are off, and thus the output voltage Vj is output from the demultiplexer circuit 16 to the data line SBj.

In this way, the data line drive circuit 14 outputs the voltage to be applied to the data lines of the liquid crystal panel 10. The data line drive circuit 15 operates in a similar manner to that of the data line drive circuit 14. The demultiplexer circuit 16 outputs the voltage output from each of the data line drive circuits 14 and 15 to any of the three data lines of the liquid crystal panel 10 in accordance with the three control signals RSW1, GSW1, and BSW1. The high level of the control signals RSW1, GSW1, and BSW1 corresponds to a selection level.

The scanning line drive circuits 12 and 13 sequentially select one scanning line from among the plurality of scanning lines in the pixel area 11. In the horizontal period in which the scanning line Gi is selected, pixel circuits for one row including the pixel circuits PRij, PGij, and PBij are collectively selected. The output voltage Vj is written to the pixel circuit PRij via the data line SRj in the first period, is written to the pixel circuit PGij via the data line SGj in the second period, and is written to the pixel circuit PBij via the data line SBj in the third period. The brightness of the pixel circuit changes in accordance with the written voltage.

Thus, by driving the scanning lines in the pixel area 11 using the scanning line drive circuits 12 and 13, and driving the data lines in the pixel area 11 by using the data line drive circuits 14 and 15, a desired image can be displayed in the pixel area 11. In addition, by providing the demultiplexer circuit 16 to drive data lines in the pixel area 11 in a time-division manner, the number of the IC chips including the data line drive circuits 14 and 15 and the number of the output terminals of the data line drive circuits 14 and 15 can be reduced.

The liquid crystal panel 20 has the same configuration as the liquid crystal panel 10 except that the liquid crystal panel 20 does not have the touch function. A pixel area 21 is provided on the TFT substrate of the liquid crystal panel 20. Scanning line drive circuits 22 and 23 are provided on the left side and the right side of the pixel area 21, respectively. Data line drive circuits 24 and 25 are provided on the lower side of the pixel area 21. A demultiplexer circuit 26 is provided between the pixel area 21 and the data line drive circuits 24 and 25. The demultiplexer circuit 26 is controlled using three control signals RSW2, GSW2, and BSW2 (not illustrated).

Note that in FIG. 1, the scanning line drive circuits are formed using the TFTs on the TFT substrate of the liquid crystal panel, but IC chips including the scanning line drive circuits may be mounted on the TFT substrate of the liquid crystal panel. Furthermore, in FIG. 1, two scanning line drive circuits are arranged on the left and right of the pixel area, and the plurality of scanning lines are driven from both ends. However, one scanning line drive circuit may be arranged on one side of the pixel area, and the plurality of scanning lines may be driven from one end. Furthermore, for example, odd-numbered scanning lines may be driven using the scanning line drive circuit on the left side of the pixel area, and even-numbered scanning lines may be driven using the scanning line drive circuit on the right side of the pixel area. This drive method is referred to as a comb tooth drive.

Figure 3:
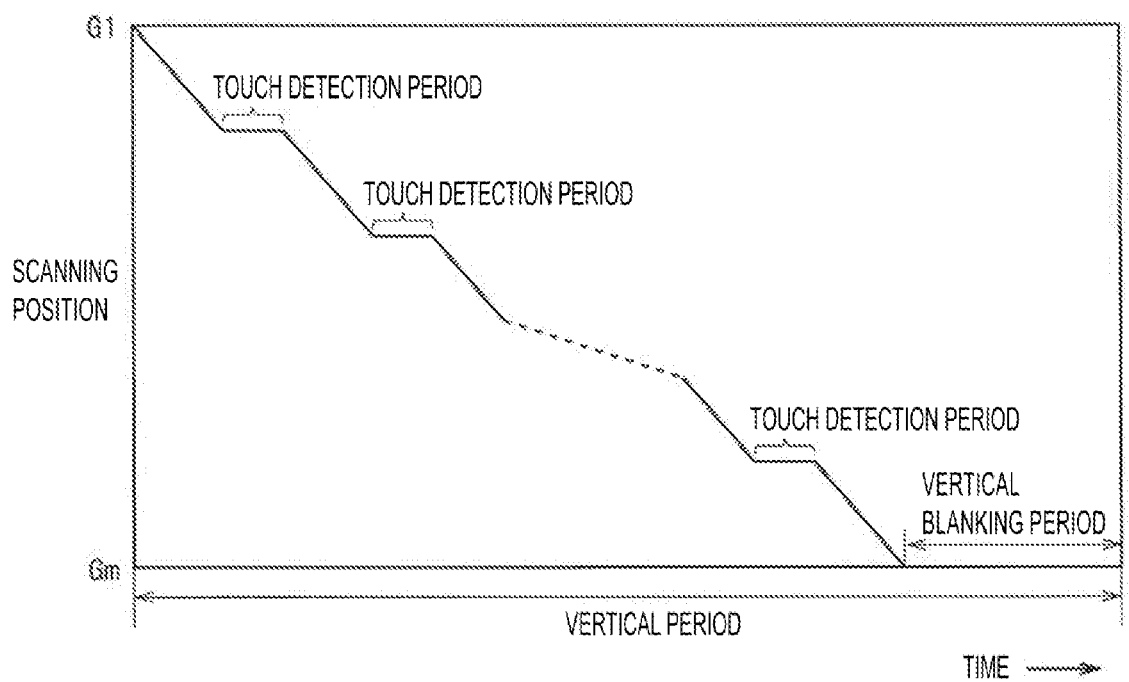
FIG. 3 is a diagram illustrating a scanning timing of a liquid crystal panel with a touch function of the liquid crystal display device illustrated in FIG. 1.
Figure 4:
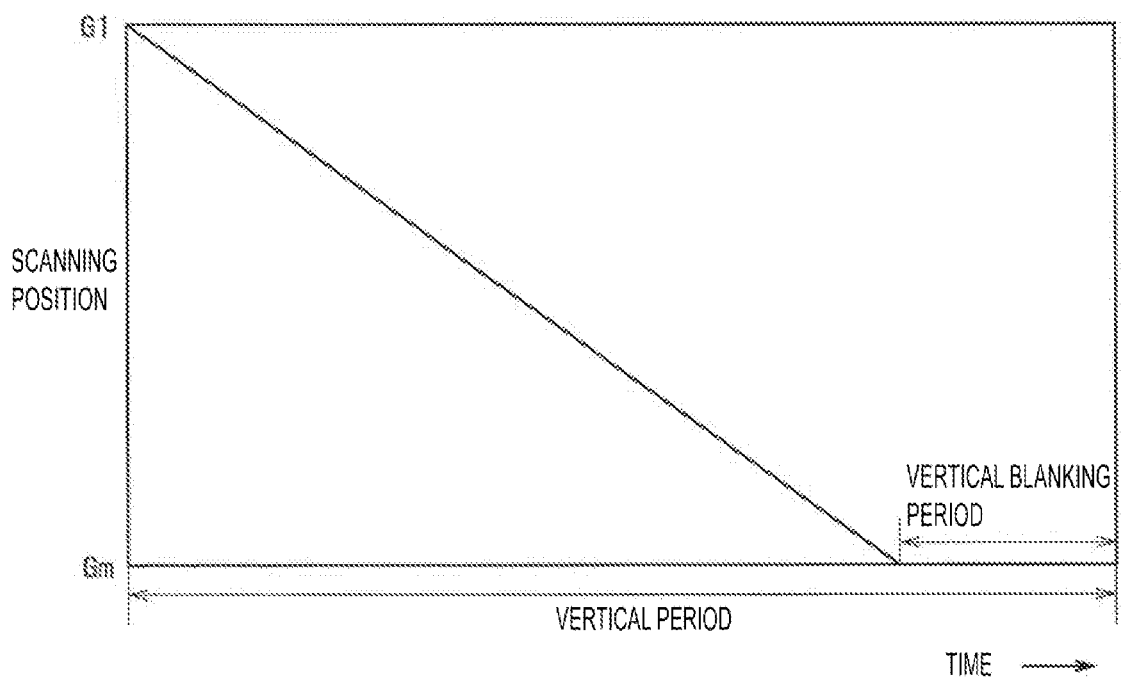
FIG. 4 is a diagram illustrating a scanning timing of a liquid crystal panel without a touch function of the liquid crystal display device illustrated in FIG. 1.

FIG. 3 is a diagram illustrating a scanning timing of the liquid crystal panel 10 with the touch function. FIG. 4 is a diagram illustrating a scanning timing of the liquid crystal panel 20 without the touch function. In FIG. 3 and FIG. 4, G1 denotes a scanning line that is first selected in the pixel areas 11 and 21, and Gm denotes a scanning line that is last selected in the pixel areas 11 and 21.

In the liquid crystal panel 10 with the touch function (FIG. 3), one or more touch detection periods are provided within one vertical period, and the drive of scanning lines need to be stopped in the touch detection period. The length and the number of the touch detection periods are determined in accordance with the size and the touch detection accuracy of the liquid crystal panel 10. For example, seven rest periods of 500 ρs in length may be provided within a vertical period of 1/60 seconds in length.

In contrast, in the liquid crystal panel 20 without the touch function (FIG. 4), it is not necessary to provide the touch detection period. Thus, even in a case where the length of one vertical period is the same between the liquid crystal panels 10 and 20, one horizontal period is shorter in the liquid crystal panel 10 with the touch function than that in the liquid crystal panel 20 without the touch function. In other words, the horizontal period used to drive the liquid crystal panel 10 with the touch function is shorter than the horizontal period used to drive the liquid crystal panel 20 without the touch function.

Hereinafter, within the horizontal period, the period secured for operation of the demultiplexer circuits 16 and 26 is referred to as the "data setting period". The data setting period is the period obtained by excluding a fall period of the voltage of the scanning line and the like from the horizontal period. The longer the horizontal period is, the longer the data setting period becomes. Thus, the data setting period within the horizontal period of the liquid crystal panel 10 with the touch function (the period secured for the operation of the demultiplexer circuit 16) is shorter than the data setting period of the liquid crystal panel 20 without the touch function (the period secured for the operation of the demultiplexer circuit 26).

Figure 5:
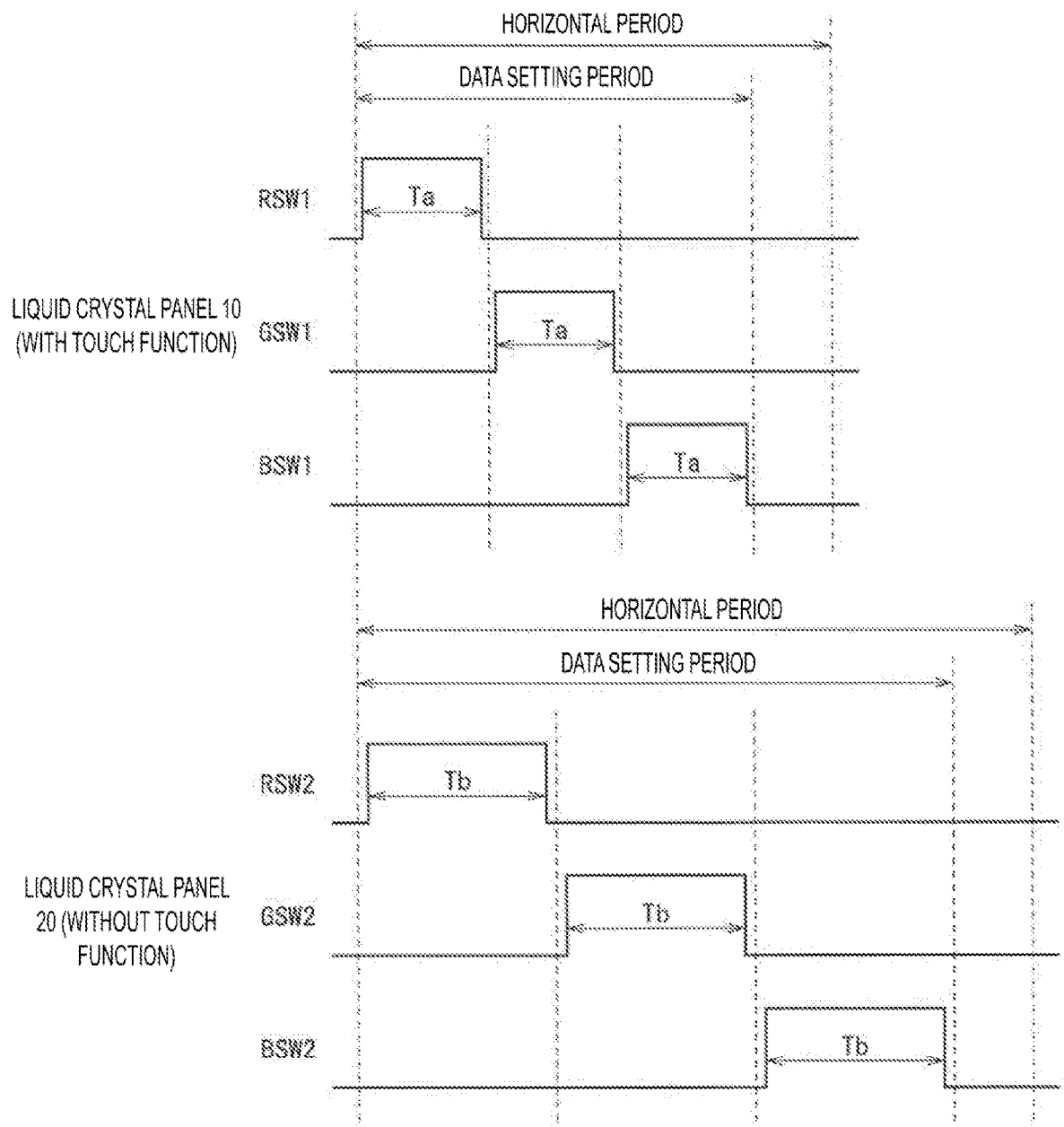
FIG. 5 is a signal waveform diagram of control signals of a demultiplexer circuit of a liquid crystal display device according to a comparative example.

As the liquid crystal display device according to a comparative example, a liquid crystal display device is considered in which the liquid crystal display device has the same configuration as the liquid crystal display device 1 and changes control signals of the demultiplexer circuit at the timing illustrated in FIG. 5. In general, in order to reliably write the output voltage of the data line drive circuit to the pixel circuit, it is preferable that the high level periods of the control signals of the demultiplexer circuit be long. Thus, in the liquid crystal display device according to the comparative example, the control signals RSW1, GSW1, and BSW1 of the demultiplexer circuit 16 are in the high level in each nearly entire one of periods (the portion excluding short periods in the head and the end of each of the periods) obtained by dividing the data setting period within the horizontal period used to drive the liquid crystal panel 10 into three equal periods. Similarly, the control signals RSW2, GSW2, and BSW2 of the demultiplexer circuit 26 become the high level in each nearly entire one of periods obtained by dividing the data setting period within the horizontal period used to drive the liquid crystal panel 20 into three equal periods.

As described above, the horizontal period used to drive the liquid crystal panel 10 is shorter than the horizontal period used to drive the liquid crystal panel 20. In the liquid crystal display device according to the comparative example, as illustrated in FIG. 5, a length Ta of the high level period of each of the control signals RSW1, GSW1, and BSW1 is shorter than a length Tb of the high level period of each of the control signals RSW2, GSW2, and BSW2.

The demultiplexer circuits 16 and 26 are formed using TFTs on the TFT substrates of the liquid crystal panels 10 and 20, respectively. The TFTs are formed, for example, using an oxide semiconductor such as Indium Gallium Zinc Oxide (IGZO) together with the pixel circuits in the pixel areas 11 and 21. The TFTs formed using the oxide semiconductor are more likely to deteriorate as the high level voltage is applied to the gate terminals for a longer time.

When using the liquid crystal display device according to the comparative example, the performance of the TFTs included in the demultiplexer circuits 16 and 26 gradually deteriorates over time. As described above, the length Ta of the high level period of each of the control signals RSW1, GSW1, and BSW1 of the demultiplexer circuit 16 is shorter than the length Tb of the high level period of each of the control signals RSW2, GSW2, and BSW2 of the demultiplexer circuit 26. Thus, in a case where the demultiplexer circuits 16 and 26 are formed using TFTs of the same size, the deterioration rate of the TFTs included in the demultiplexer circuit 16 is slower than the deterioration rate of the TFTs included in the demultiplexer circuit 26.

As a result, when the liquid crystal display device according to the comparative example is used for an extended period of time, a difference in display quality is generated between the liquid crystal panels 10 and 20. In a liquid crystal module containing only one liquid crystal panel, even if the display quality deteriorates, the deterioration of the display quality is less likely to be recognized. However, in the liquid crystal display device according to the comparative example, since the two liquid crystal panels 10 and 20 are arranged side-by-side in the horizontal direction, the difference in display quality between the liquid crystal panels 10 and 20 is easily recognized.

As a method for solving this problem, a method is conceivable in which the demultiplexer circuits 16 and 26 are designed using TFTs of different sizes in consideration of the difference in deterioration rate between the TFTs. However, according to the method, since the demultiplexer circuits 16 and 26 are individually designed using the TFTs of different sizes, the design costs of the liquid crystal panels 10 and 20 are increased. In addition, since the liquid crystal panels 10 and 20 are manufactured using different masks, the manufacturing costs of the liquid crystal panels 10 and 20 are increased.

Thus, in the liquid crystal display device 1 according to the present embodiment, the length of the high level period of each of the control signals RSW1, GSW1, and BSW1 of the demultiplexer circuit 16 and the length of the high level period of each of the control signals RSW2, GSW2, and BSW2 of the demultiplexer circuit 26 are set to be approximately the same.

Figure 6:
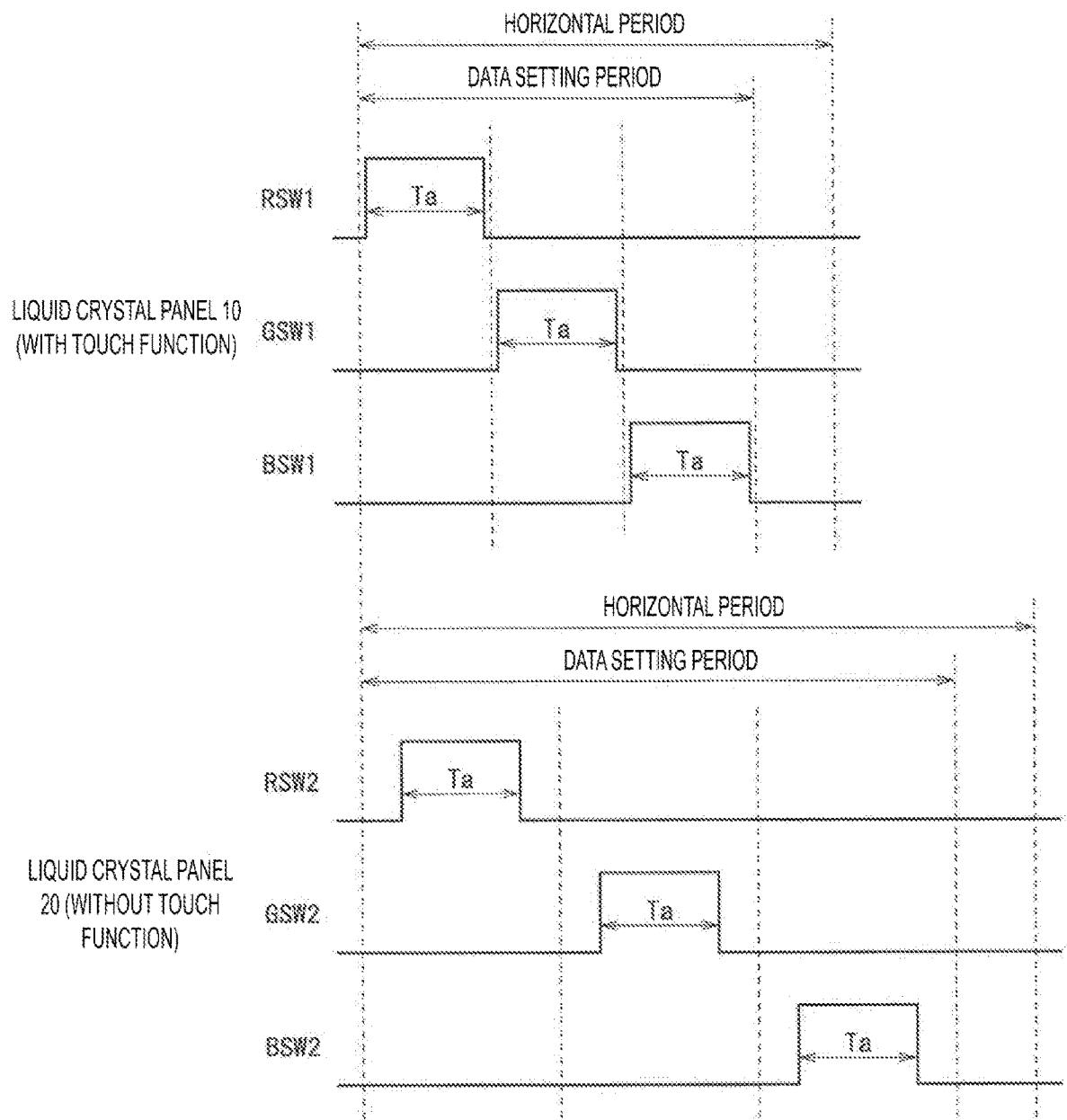
FIG. 6 is a signal waveform diagram of control signals of the demultiplexer circuit of the liquid crystal display device illustrated in FIG. 1.

FIG. 6 is a signal waveform diagram of control signals of the demultiplexer circuits 16 and 26 of the liquid crystal display device 1. In the liquid crystal display device 1, for the liquid crystal panel 10, each nearly entire one of periods obtained by dividing the data setting period within the horizontal period used to drive the liquid crystal panel 10 into three equal periods is set as the high level period of each of the control signals RSW1, GSW1, and BSW1 of the demultiplexer circuit 16. For the liquid crystal panel 20, a central portion of each of periods obtained by dividing the data setting period within the horizontal period used to drive the liquid crystal panel 20 into three equal periods is provided with the high level period of each of control signals RSW2, GSW2, and BSW2 of the demultiplexer circuit 26, and the length of each of these periods is set to be the same as the length of the high level period of each of the control signals RSW1, GSW1, and BSW1. In the liquid crystal display device 1, as illustrated in FIG. 6, the lengths of the high level periods of the control signals RSW1, GSW1, BSW1, RSW2, GSW2, and BSW2 are all Ta.

As described above, it is preferable that the high level periods of the control signals of the demultiplexer circuit be long. Thus, in the liquid crystal display device 1, while the length of the high level period of each of the control signals RSW1, GSW1, and BSW1 is set to be as long as possible (set to be approximately ⅓ of the length of the data setting period within the horizontal period used to drive the liquid crystal panel 10), the length of the high level period of each of the control signals RSW2, GSW2, and BSW2 is matched with the length of the high level period of each of the control signals RSW1, GSW1, and BSW1.

By using the liquid crystal display device 1, the performance of the TFTs included in the demultiplexer circuits 16 and 26 gradually deteriorates over time. In the liquid crystal display device 1, the length of the high level period of each of the control signals RSW1, GSW1, and BSW1 of the demultiplexer circuit 16 and the length of the high level period of each of the control signals RSW2, GSW2, and BSW2 of the demultiplexer circuit 26 are approximately the same. Thus, in a case where the demultiplexer circuits 16 and 26 are formed using the TFTs of the same size, the deterioration rate of the TFTs included in the demultiplexer circuit 16 is approximately the same as the deterioration rate of the TFTs included in the demultiplexer circuit 26. Accordingly, when the liquid crystal display device 1 is used for an extended period of time, the difference in display quality between the liquid crystal panels 10 and 20 can be prevented. Furthermore, the above-described effect can be easily achieved by using the identical circuits in the demultiplexer circuits 16 and 26.

As described above, the liquid crystal display device 1 according to the present embodiment, includes, a first display panel (liquid crystal panel 10) with a touch function, a second display panel (liquid crystal panel 20) without a touch function, a first data line drive circuit (data line drive circuits 14 and 15) configured to output a voltage to be applied to data lines of the first display panel, a first demultiplexer circuit (demultiplexer circuit 16) formed on the first display panel and configured to output the voltage output from the first data line drive circuit to any of three data lines of the first display panel in accordance with three first control signals (control signals RSW1, GSW1, BSW1), a second data line drive circuit (data line drive circuits 24 and 25) configured to output a voltage to be applied to data lines of the second display panel, and a second demultiplexer circuit (demultiplexer circuit 26) formed on the second display panel and configured to output the voltage output from the second data line drive circuit to any of the three data lines of the second display panel in accordance with three second control signals (control signals RSW2, GSW2, and BSW2). The horizontal period used to drive the first display panel is shorter than the horizontal period used to drive the second display panel, and a length of a period in which each of the first control signals is at the selection level (high level) and a length of a period in which each of the second control signals is at the selection level is approximately the same.

In the liquid crystal display device 1 according to the present embodiment, since the length of the period in which each of the first control signals is at the selection level and the length of the period in which each of the second control signals is at the selection level is approximately the same, in a case where the first demultiplexer circuit and the second demultiplexer circuit are identical circuits, the deterioration rate of the first demultiplexer circuit and the deterioration rate of the second demultiplexer circuit are approximately the same. Thus, when the liquid crystal display device 1 is used for an extended period of time, the difference in display quality between the display panels due to the difference in deterioration rate between the demultiplexer circuits can be easily prevented.

The length of the period in which each of the first control signals is at the selection level is approximately ⅓ of the period of the data setting period within the horizontal period used to drive the first display panel. Accordingly, the period in which the output voltage of the first data line drive circuit is written to the pixel circuits can be longer. The period in which each of the second control signals is at the selection level is set in the central portion of each of the periods obtained by dividing the data setting period within the horizontal period used to drive the second display panel into three equal periods.

The first demultiplexer circuit includes three TFTs 31 to 33 corresponding to respective output terminals of the first data line drive circuit, and the second demultiplexer circuit includes three TFTs corresponding to respective output terminals of the second data line drive circuit. Thus, the first and second demultiplexer circuits can be easily configured. The first and second demultiplexer circuits are identical circuits configured using the TFTs of the same size. Thus, when manufacturing the display panel by using a TFT process, the first display panel and the second display panel can be manufactured using the same mask. In this way, since there is no need to prepare a separate mask for each of the first and second display panels, the difference in display quality between the first and second display panels can be prevented at low cost.

The TFTs included in the first and second demultiplexer circuits are formed using the oxide semiconductor. The TFTs included in the first and second demultiplexer circuits are the N-channel type transistors, and the selection level is the high level. Thus, by configuring the first and second demultiplexer circuits by using the TFTs (or N-channel type TFTs) formed using the oxide semiconductor, when the liquid crystal display device 1 is used for an extended period of time, the difference in display quality between the display panels due to the difference in deterioration rate between the demultiplexer circuits can be easily prevented. The first and second display panels are liquid crystal panels and arranged with their longitudinal directions being matched with each other. As a result, a liquid crystal module suitable for on-board use or the like can be configured.

Note that, among the masks used to manufacture the liquid crystal panel, masks (for example, masks required to form pixel electrodes or common electrodes) other than the masks necessary to form the demultiplexer circuits may differ from each other between the first and second display panels. In this case as well, by sharing between the first and second display panels the masks necessary to form the demultiplexer circuits, the manufacturing cost of the liquid crystal panels can be reduced.

Second Embodiment

A liquid crystal display device according to a second embodiment has the same configuration as that of the liquid crystal display device 1 according to the first embodiment (refer to FIG. 1 and FIG. 2). The liquid crystal display device according to the present embodiment differs from the liquid crystal display device 1 according to the first embodiment only in the change timing of the control signals of the demultiplexer circuit 26.

Figure 7:
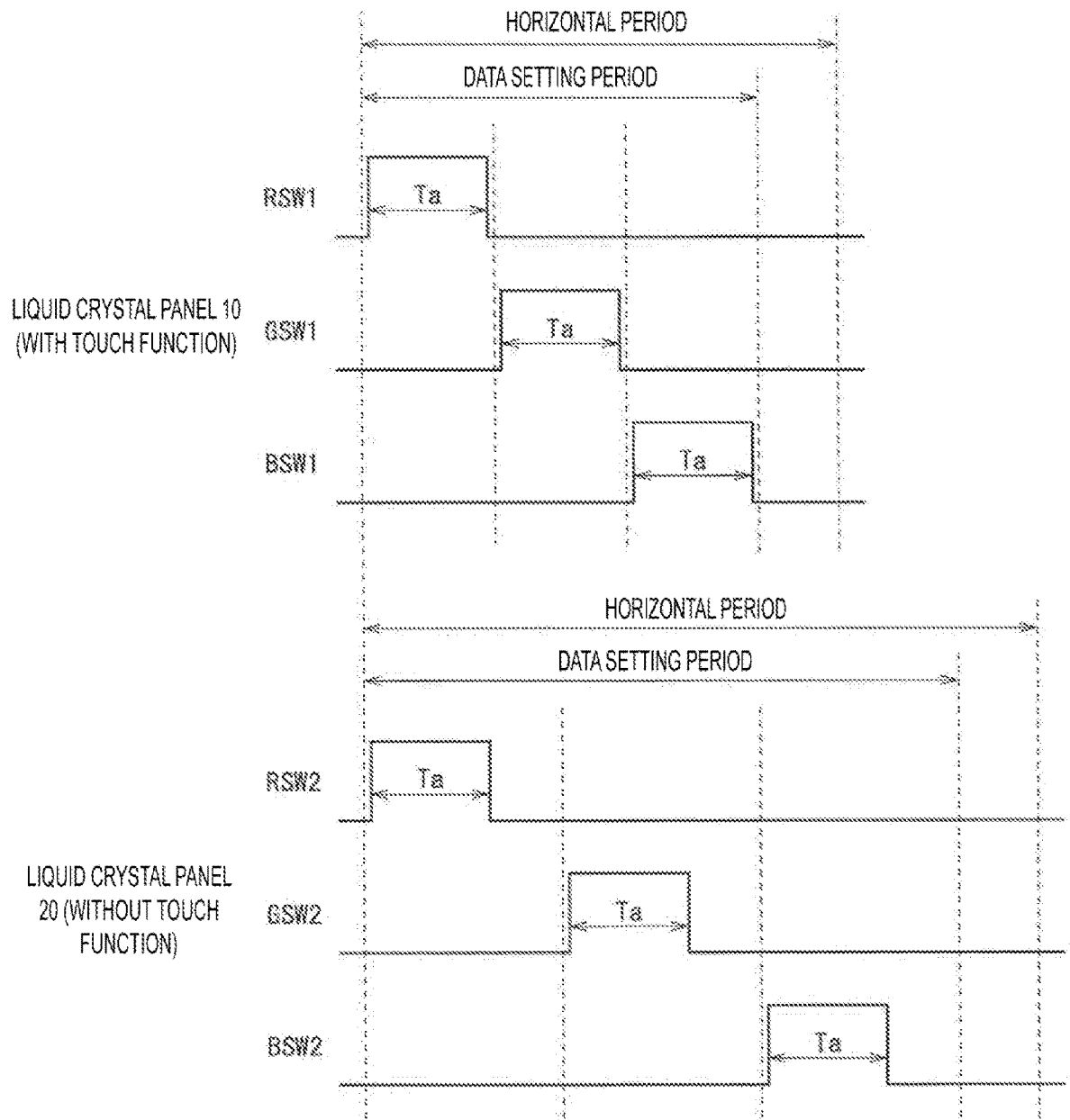
FIG. 7 is a signal waveform diagram of control signals of a demultiplexer circuit of a liquid crystal display device according to a second embodiment.

FIG. 7 is a signal waveform diagram of control signals of the demultiplexer circuits 16 and 26 of the liquid crystal display device according to the present embodiment. In the liquid crystal display device according to the present embodiment, for the liquid crystal panel 10, each nearly entire one of periods obtained by dividing the data setting period within the horizontal period used to drive the liquid crystal panel 10 into three equal periods is set as each of the high level periods of control signals RSW1, GSW1, and BSW1 of the demultiplexer circuit 16. For the liquid crystal panel 20, each of head portions of each of periods obtained by dividing the data setting period within the horizontal period used to drive the liquid crystal panel 20 into three equal periods is provided with each of the high level periods of control signals RSW2, GSW2, and BSW2 of the demultiplexer circuit 26, and the length of each of these periods is set to be the same as the length of the high level period of each of the control signals RSW1, GSW1, and BSW1. Also in the liquid crystal display device according to the present embodiment, as illustrated in FIG. 7, the lengths of the high level periods of the control signals RSW1, GSW1, BSW1, RSW2, GSW2, and BSW2 are all Ta.

In the liquid crystal display device according to the present embodiment, the period in which each of the second control signals (control signals RSW2, GSW2, and BSW2) is at the selection level (high level) is set in the head portion of each of the periods obtained by dividing the data setting period within the horizontal period used to drive the second display panel (liquid crystal panel 20) into three equal periods. The liquid crystal display device according to the present embodiment also has the same effect as the liquid crystal display device according to the first embodiment.

Third Embodiment

A liquid crystal display device according to a third embodiment has the same configuration as that of the liquid crystal display device 1 according to the first embodiment (refer to FIG. 1 and FIG. 2). The liquid crystal display device according to the present embodiment differs from the liquid crystal display device 1 according to the first embodiment only in the change timing of the control signals of the demultiplexer circuit 26.

Figure 8:
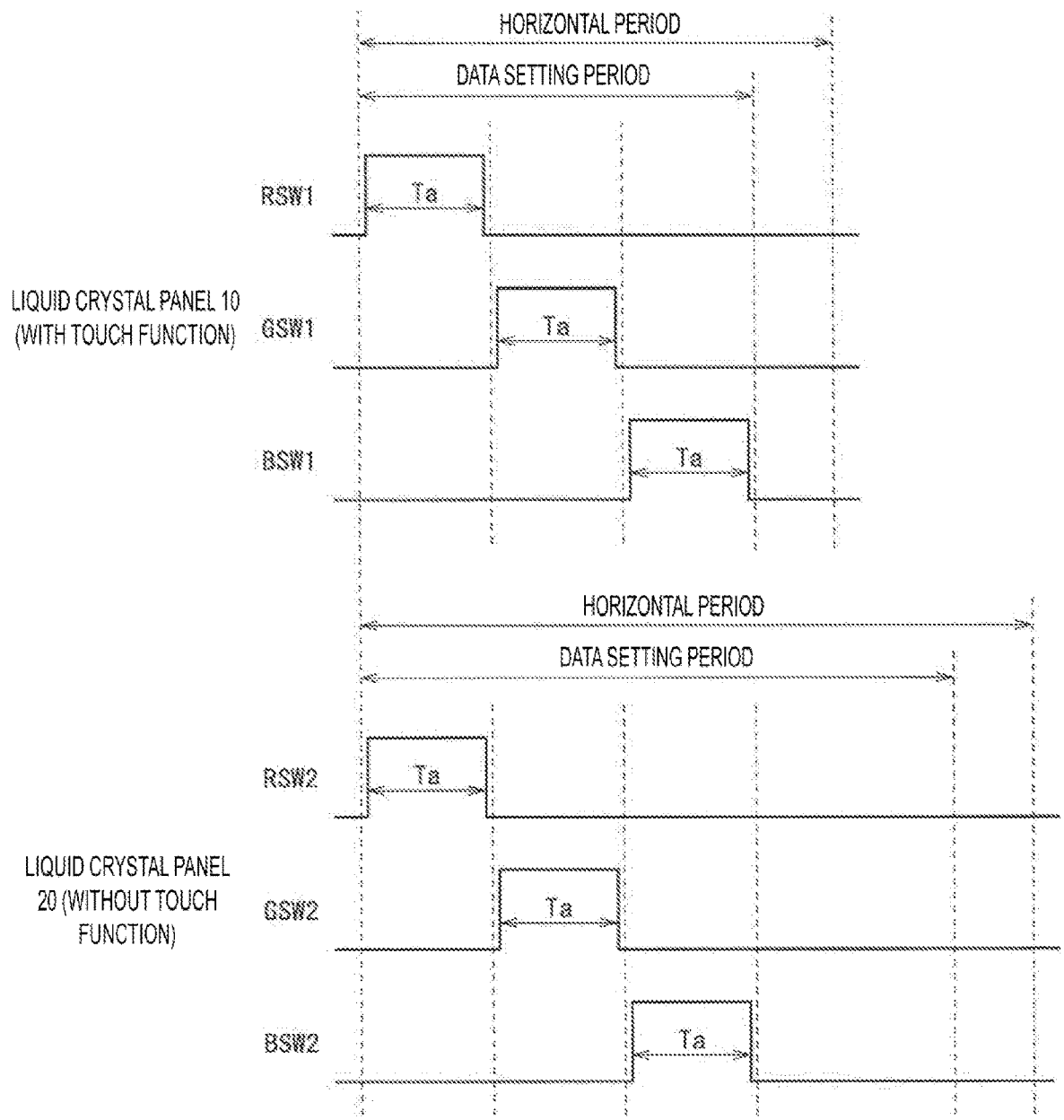
FIG. 8 is a signal waveform diagram of control signals of a demultiplexer circuit of a liquid crystal display device according to a third embodiment.

FIG. 8 is a signal waveform diagram of control signals of the demultiplexer circuits 16 and 26 of a liquid crystal display device according to the present embodiment. In the liquid crystal display device according to the present embodiment, for the liquid crystal panel 10, each nearly entire one of periods obtained by dividing the data setting period within the horizontal period used to drive the liquid crystal panel 10 into three equal periods is set as each of the high level periods of control signals RSW1, GSW1, and BSW1 of the demultiplexer circuit 16. For the liquid crystal panel 20, the high level periods of the control signals RSW2, GSW2, and BSW2 of the demultiplexer circuit 26 are set in the same time periods as the high level periods of the control signals RSW1, GSW1, and BSW1. Also in the liquid crystal display device according to the present embodiment, as illustrated in FIG. 8, the lengths of the high level periods of the control signals RSW1, GSW1, BSW1, RSW2, GSW2, and BSW2 are all Ta.

In the liquid crystal display device according to the present embodiment, the period in which each of the second control signals (control signals RSW2, GSW2, and BSW2) is at the selection level (high level) is set in the same time period as the period in which each of the first control signals (control signals RSW1, GSW1, and BSW1) is at the selection level. The liquid crystal display device according to the present embodiment also has the same effect as the liquid crystal display device according to the first embodiment.

Fourth Embodiment

Figure 9:
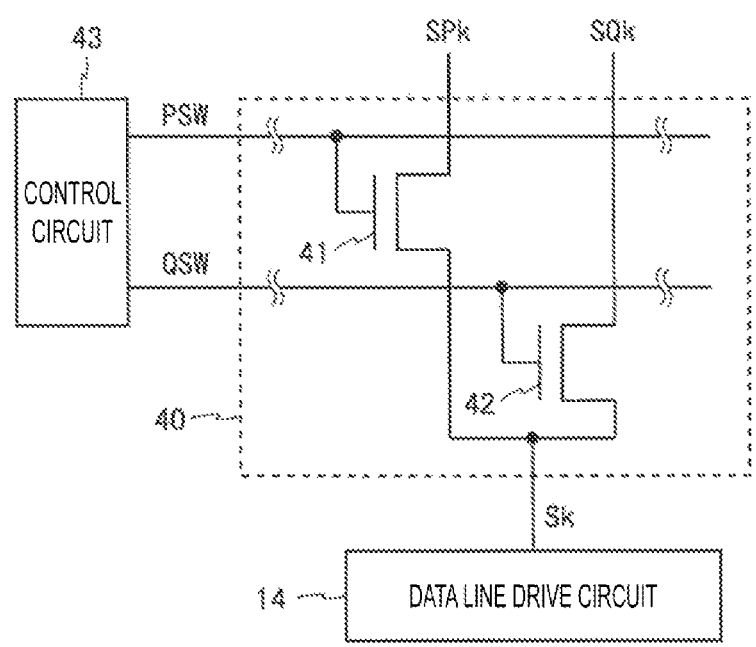
FIG. 9 is a circuit diagram of a demultiplexer circuit of a liquid crystal display device according to a fourth embodiment.
Figure 10:
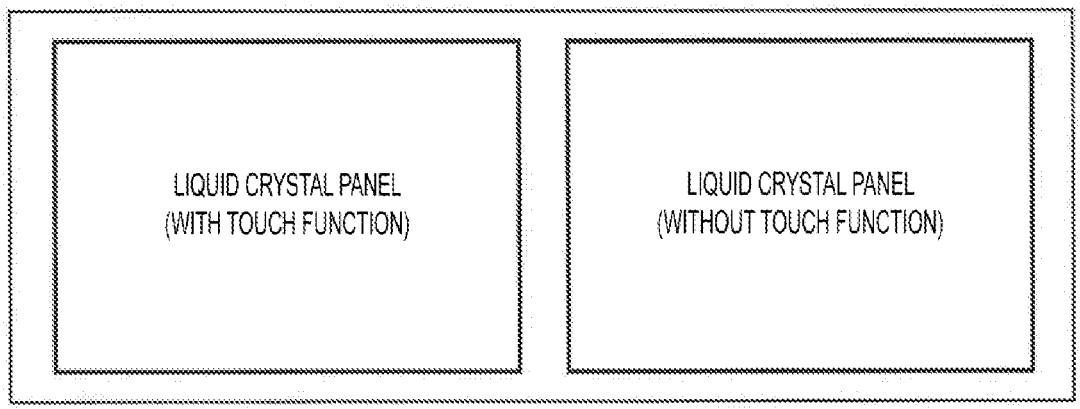
FIG. 10 is a diagram illustrating a liquid crystal module including two liquid crystal panels.
Figure 11:
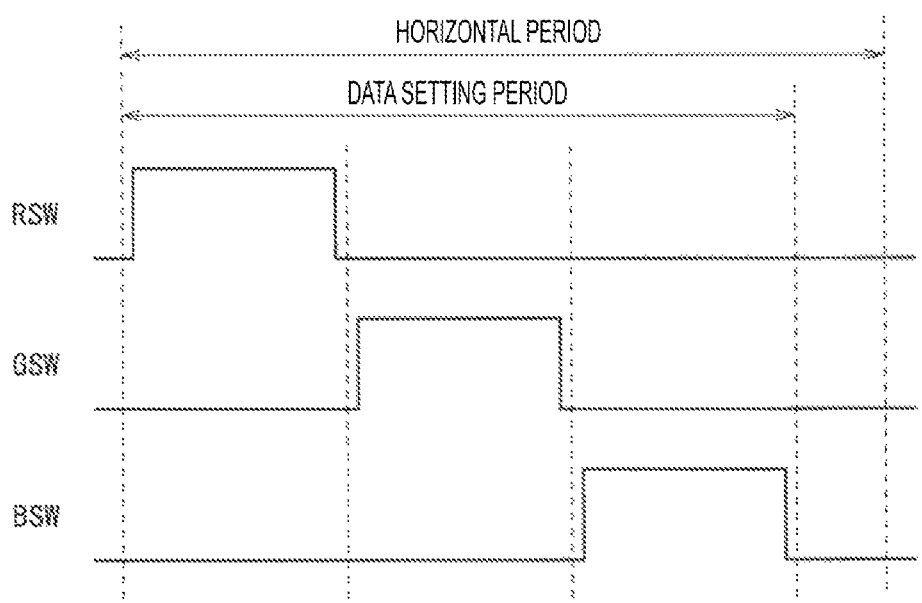
FIG. 11 is a signal waveform diagram of control signals of a demultiplexer circuit of a known liquid crystal display device.
Figure 12:
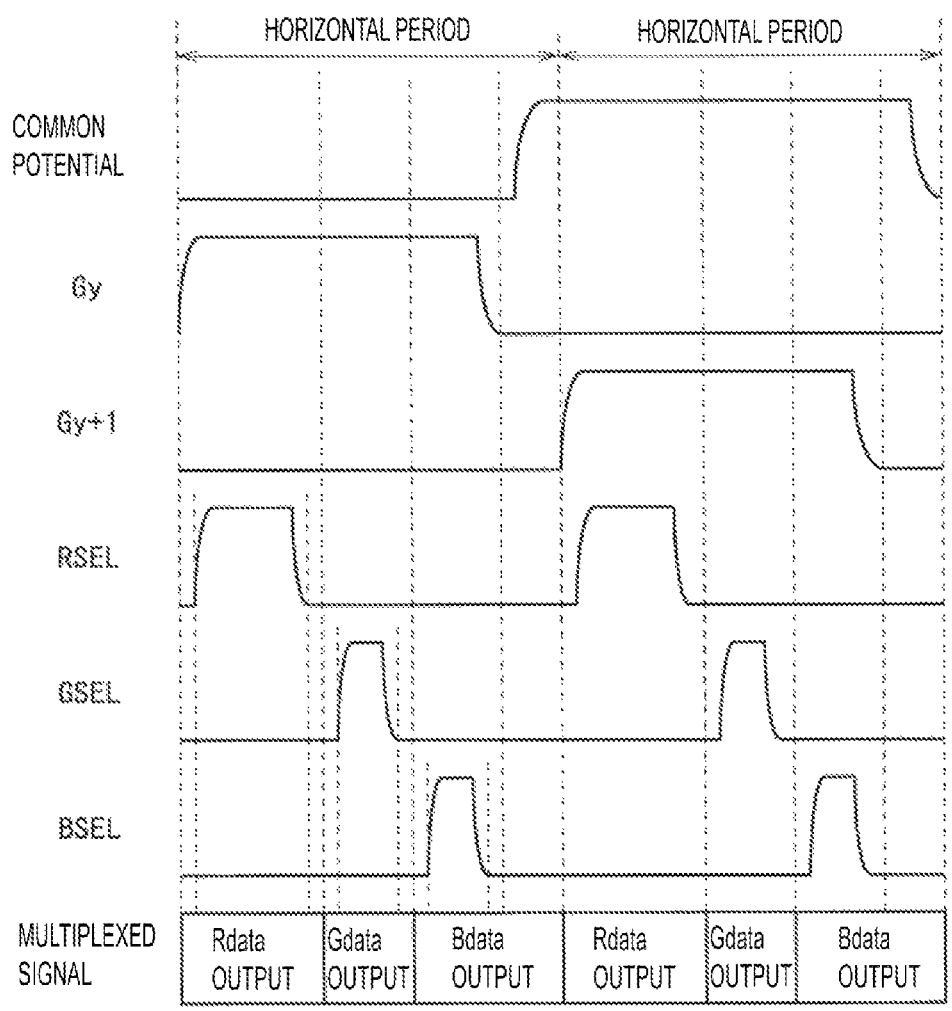
FIG. 12 is a signal waveform diagram of control signals of a demultiplexer circuit of a known liquid crystal display device.

The liquid crystal display device according to the fourth embodiment has the same overall configuration as the liquid crystal display device 1 according to the first embodiment (see FIG. 1), and includes the demultiplexer circuit illustrated in FIG. 9 in place of the demultiplexer circuits 16 and 26.

FIG. 9 is a circuit diagram of a demultiplexer circuit of a liquid crystal display device according to the present embodiment. The two data lines SPk and SQk illustrated in FIG. 9 are driven by using the data line drive circuit 14. In FIG. 9, in the demultiplexer circuit 40, a circuit (hereinafter referred to as a circuit C2) corresponding to the data lines SPk and SQk is described. The circuit C2 includes two N-channel type TFTs 41 and 42. The control circuit 43 outputs two control signals PSW and QSW to control the demultiplexer circuit 40.

Each one of the conduction terminals (the lower terminals in FIG. 8) of each of the TFTs 41 and 42 is connected to the output terminal Sk of the data line drive circuit 14. Hereinafter, the voltage output from the output terminal Sk is referred to as an output voltage Vk. The other conduction terminals of the respective TFTs 41 and 42 are connected to the data lines SPk and SQk. The control signals PSW and QSW are applied to the gate terminals of the TFTs 41 and 42, respectively.

The first period in which the control signal PSW is at the high level and the second period in which the control signal QSW is at the high level are set within the horizontal period used to drive the liquid crystal panels 10 and 20, so that the first period and the second period do not to overlap with each other. In the first period, the TFT 41 is on and the TFT 42 is off, and thus the output voltage Vk is output to the data line SPk. In the second period, the TFT 42 is on and the TFT 41 is off, and thus the output voltage Vk is output to the data line SQk.

In the liquid crystal display device according to the present embodiment, the lengths of the high level periods of the control signals PSW and QSW of the demultiplexer circuit 16 and the lengths of the high level periods of the control signals PSW and QSW of the demultiplexer circuit 26 are approximately the same. The length of the high level period of each of the control signals PSW and QSW of the demultiplexer circuit 16 is preferably approximately ½ of the data setting period within the horizontal period used to drive the liquid crystal panel 10. Each of the high level periods of the control signals PSW and QSW of the demultiplexer circuit 26 may be set in the central portion or the head portion of each of the periods obtained by dividing the data setting period within the horizontal period used to drive the liquid crystal panel 20 into two equal periods, and may be set in the same time periods as those of the high level periods of the control signals PSW and QSW of the demultiplexer circuit 16. The liquid crystal display device according to the present embodiment also has the same effect as the liquid crystal display device according to the first embodiment.

The following modifications can be made on the liquid crystal display device according to each of the embodiments described above. In the liquid crystal display device according to each of the embodiments, the demultiplexer circuit is configured using N-channel type TFTs. In this case, the high level corresponds to the selection level. In a liquid crystal display device according to one of the modifications, the demultiplexer circuit may be configured using P-channel type TFTs. In this case, since the low level corresponds to the selection level, it is only required that the polarity of the control signal of the demultiplexer circuit be reversed. In addition, the liquid crystal display device according to each of the embodiments includes two liquid crystal panels, but a liquid crystal display device according to one of the modifications may include three or more liquid crystal panels.

Generally, a liquid crystal display device includes a first display panel with a touch function, a second display panel without a touch function, a first data line drive circuit configured to output a voltage to be applied to data lines of the first display panel, a first demultiplexer circuit formed on the first display panel and configured to output the voltage output from the first data line drive circuit to any of K (K is an integer of 2 or greater) data lines of the first display panel in accordance with K first control signals, a second data line drive circuit configured to output a voltage to be applied to data lines of the second display panel, and a second demultiplexer circuit formed on the second display panel and configured to output the voltage output from the second data line drive circuit to any of K data lines of the second display panel in accordance with K second control signals, wherein when a horizontal period used to drive the first display panel is shorter than a horizontal period used to drive the second display panel, a length of a period in which each of the first control signals is at a selection level and a length of a period in which each of the second control signals is at a selection level may be approximately the same. The first to third embodiments correspond to a case where K=3, and the fourth embodiment corresponds to a case where K=2.

Further, other than the liquid crystal display device, a liquid crystal display device that includes the plurality of display panels and drives the data lines of the plurality of display panels in a time-division manner may be configured by a similar method described above.

Although the disclosure has been described in detail above, the above description is exemplary in all respects and is not limiting. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A display device comprising:
a first display panel with a touch function;
a second display panel without a touch function;
a first data line drive circuit configured to output a voltage to be applied to data lines of the first display panel;
a first demultiplexer circuit formed on the first display panel and configured to output the voltage from the first data line drive circuit to any of K data lines of the first display panel according to K first control signals;
a second data line drive circuit configured to output a voltage to be applied to data lines of the second display panel; and
a second demultiplexer circuit formed on the second display panel and configured to output the voltage from the second data line drive circuit to any of K data lines of the second display panel according to K second control signals, wherein:
a first horizontal period during which the first display panel is driven is shorter than a second horizontal period during which the second display panel is driven;
a length of a period during which each of the first control signals is at a selection level and a length of a period during which each of the second control signals is at a selection level are approximately equal;
the length of the period during which each of the first control signals is at the selection level is approximately 1/K of a length of a data setting period within the first horizontal period; and
K is an integer of 2 or more.

2. The display device according to claim 1, wherein:
the period during which each of the second control signals is at the selection level is set in a head portion of each of divided data setting periods; and
the divided data setting periods are obtained by dividing a data setting period within the second horizontal period into K equal periods.

3. The display device according to claim 1, wherein the period during which each of the second control signals is at the selection level is set in a same time period as the period during which each of the first control signals is at the selection level.

4. The display device according to claim 1, wherein:
the first demultiplexer circuit includes K first thin film transistors and the K first thin film transistors correspond to one output terminal of the first data line drive circuit; and
the second demultiplexer circuit includes K second thin film transistors and the K second thin film transistors correspond to one output terminal of the second data line drive circuit.

5. The display device according to claim 4, wherein:
the first thin film transistors and second thin film transistors are a same size; and
the first demultiplexer circuit and the second demultiplexer circuit are identical and are configured using the corresponding first and second thin film transistors.

6. The display device according to claim 4, wherein the first and second thin film transistors are formed using an oxide semiconductor.

7. The display device according to claim 4, wherein:
the first and second thin film transistors are N-channel type transistors; and
the selection level is a high level.

8. The display device according to claim 4, wherein:
the first and second thin film transistors are P-channel type transistors; and
the selection level is a low level.

9. The display device according to claim 1, wherein the first display panel and second display panel are liquid crystal panels and are arranged with their longitudinal directions matched with each other.

10. The display device according to claim 1, wherein K is equal to 3.

11. The display device according to claim 1, wherein K is equal to 2.

12. A drive method of a display device including a first display panel with a touch function and a second display panel without a touch function, the drive method comprising:
outputting a voltage to be applied to data lines of the first display panel from a first data line drive circuit;
outputting the voltage from the first data line drive circuit to any of K data lines of the first display panel according to K first control signals by using a first demultiplexer circuit formed on the first display panel;
outputting a voltage to be applied to data lines of the second display panel from a second data line drive circuit; and
outputting the voltage from the second data line drive circuit to any of K data lines of the second display panel according to K second control signals by using a second demultiplexer circuit formed on the second display panel, wherein:
a first horizontal period during which the first display panel is driven is shorter than a second horizontal period during which the second display panel is driven; and
a length of a period during which each of the first control signals is at a selection level and a length of a period during which each of the second control signals is at a selection level are approximately equal;
the length of the period during which each of the first control signals is at the selection level is approximately 1/K of a length of a data setting period within the first horizontal period; and
K is an integer of 2 or more.

13. A display device comprising:
a first display panel with a touch function;
a second display panel without a touch function;
a first data line drive circuit configured to output a voltage to be applied to data lines of the first display panel;
a first demultiplexer circuit formed on the first display panel and configured to output the voltage from the first data line drive circuit to any of K data lines of the first display panel according to K first control signals;
a second data line drive circuit configured to output a voltage to be applied to data lines of the second display panel; and
a second demultiplexer circuit formed on the second display panel and configured to output the voltage from the second data line drive circuit to any of K data lines of the second display panel according to K second control signals, wherein:
a first horizontal period during which the first display panel is driven is shorter than a second horizontal period during which the second display panel is driven;
a length of a period during which each of the first control signals is at a selection level and a length of a period during which each of the second control signals is at a selection level are approximately equal; and
the length of the period during which each of the second control signals is at the selection level is set in a central portion of each of divided data setting periods, and the divided data setting periods are obtained by dividing a data setting period within the second horizontal period into K equal periods.

14. The display device according to claim 13, wherein:
the first demultiplexer circuit includes K first thin film transistors and the K first thin film transistors correspond to one output terminal of the first data line drive circuit; and
the second demultiplexer circuit includes K second thin film transistors and the K second thin film transistors correspond to one output terminal of the second data line drive circuit.

15. The display device according to claim 14, wherein:
the first thin film transistors and second thin film transistors are a same size; and the first demultiplexer circuit and the second demultiplexer circuit are identical and are configured using the corresponding first and second thin film transistors.

16. The display device according to claim 14, wherein the first and second thin film transistors are formed using an oxide semiconductor.

17. The display device according to claim 14, wherein:
the first and second thin film transistors are N-channel type transistors; and
the selection level is a high level.

18. The display device according to claim 14, wherein:
the first and second thin film transistors are P-channel type transistors; and
the selection level is a low level.

19. The display device according to claim 13, wherein the first and second display panels are liquid crystal panels and arranged with their longitudinal directions being matched with each other.

20. The display device according to claim 13, wherein K is equal to 3.

* * * * *